(12) United States Patent
Kimball et al.

(10) Patent No.: US 7,622,835 B2
(45) Date of Patent: Nov. 24, 2009

(54) MOTOR PROTECTOR ATTACHMENT SYSTEM

(75) Inventors: Timothy F. Kimball, Uxbridge, MA (US); Huade Tan, Readville, MA (US)

(73) Assignee: Sensata Technologies Massachusetts, Inc., Attleboro, MA (US)

( * ) Notice: Subject to any disclaimer, the term of this patent is extended or adjusted under 35 U.S.C. 154(b) by 98 days.

(21) Appl. No.: 11/957,704

(22) Filed: Dec. 17, 2007

(65) Prior Publication Data

US 2008/0179974 A1    Jul. 31, 2008

Related U.S. Application Data

(60) Provisional application No. 60/886,770, filed on Jan. 26, 2007.

(51) Int. Cl.
*H02K 11/00*    (2006.01)
(52) U.S. Cl. .................. 310/68 C; 361/24; 310/71
(58) Field of Classification Search .............. 310/68 C, 310/68 R, 71; 361/22–25; 337/372–380
See application file for complete search history.

(56) References Cited

U.S. PATENT DOCUMENTS

| | | | | |
|---|---|---|---|---|
| 4,241,370 A | * | 12/1980 | De Filippis et al. | 361/24 |
| 4,467,385 A | * | 8/1984 | Bandoli et al. | 361/24 |
| 4,748,531 A | * | 5/1988 | Ortiz | 361/24 |
| 5,170,307 A | * | 12/1992 | Nacewicz et al. | 361/24 |
| 5,515,217 A | * | 5/1996 | Higashikata et al. | 361/22 |
| 5,615,071 A | * | 3/1997 | Higashikata et al. | 361/22 |
| 7,109,840 B2 | | 9/2006 | Turner et al. | |

* cited by examiner

*Primary Examiner*—Michael C Zarroli
(74) *Attorney, Agent, or Firm*—Russell E. Baumann

(57) ABSTRACT

A motor protector receiving bracket (10) is shown for use with a multiphase motor protector having at least two terminal pins (4 and 5). The bracket has a back wall formed with first (12e) and second (12h) slots for receiving respective pin terminals of the protector cradled in the bracket and are formed with features to prevent any movement of the protector relative to the bracket. The bracket is in turn adapted to be attached to a spring clip (14) welded to a motor casing.

8 Claims, 9 Drawing Sheets

MOTOR PROTECTOR ATTACHMENT SYSTEM

RELATED APPLICATIONS

Priority is claimed under 35 USC Section 119(e)(1) of Provisional Application Ser. No. 60/886,770 filed Jan. 26, 2007.

FIELD OF THE INVENTION

This invention relates generally to a bracket member and more specifically to an insulative bracket member that works with a bracket clip to hold a motor protector in place and in reliable electrical connection to a motor, such as a compressor motor.

BACKGROUND OF THE INVENTION

It is conventional to use a motor protector within a hermetically sealed casing of a motor driven compressor. The motor protector, contained in an insulative sleeve, is typically directly mounted on the motor windings of a three phase motor. This arrangement has worked well; however, it requires a relatively expensive assembly procedure. Further, there is a desire to minimize the size of the compressor housing which is hampered by directly mounting the protector on the winding.

One solution used in the past has been to mount the motor protector to the casing of the motor by using an insert molded attachment member which is mounted on a bracket member welded to the inside of the casing. This approach has the disadvantages of using a costly insert molded component with terminals and requires a costly assembly operation. Still further, the insert molded component can affect the protector's response time because it essentially surrounds the protector.

SUMMARY OF THE INVENTION

It is an object of the invention to provide an improved attachment member for a mounting a motor protector to the casing of a motor. It is a further object of the invention to provide an attachment member that is economical to produce and one that provides for easy, reliable assembly of the compressor. Yet another object is the provision of a motor protector mounting member providing a suitable thermal coupling to the compressor. Another object of the invention is the provision of a motor protector attachment system that prevents dislodgment of the motor protector due to shock and vibration as well as due to the force of insertion of quick connects upon assembly.

Briefly, in accordance with the preferred embodiment of the invention, an electrically insulating plastic bracket for a multiphase electric motor is described for securing a motor protector to the housing of a motor by means of a spring clip. The bracket is provided with a snap retaining feature for securing the bracket to the clip that has previously been welded to the motor casing for easy attachment and detachment of the motor protector and bracket combination to and from the motor casing. The bracket has a slot arrangement to provide retaining features for securing the motor protector in a cradled protector seat comprising a four sided cavity. The motor protector, for which the bracket was designed, comprises a generally oval shaped header and cup shaped dome with two independent terminal pins protruding from the header. In mounting, one pin is slid into a first slot feature and the protector rotated so that the other pin comes into alignment with a second slot feature and is then snapped into a retention feature in the second slot feature to securely mount the protector to the bracket. When the protector is mounted in the bracket the walls of the bracket effectively constrain the device so that is immovable relative to the bracket.

Other objects and features of the invention will become more readily apparent when read in conjunction with the accompanying drawings.

DETAILED DESCRIPTION OF THE PREFERRED EMBODIMENT

Figure 1:
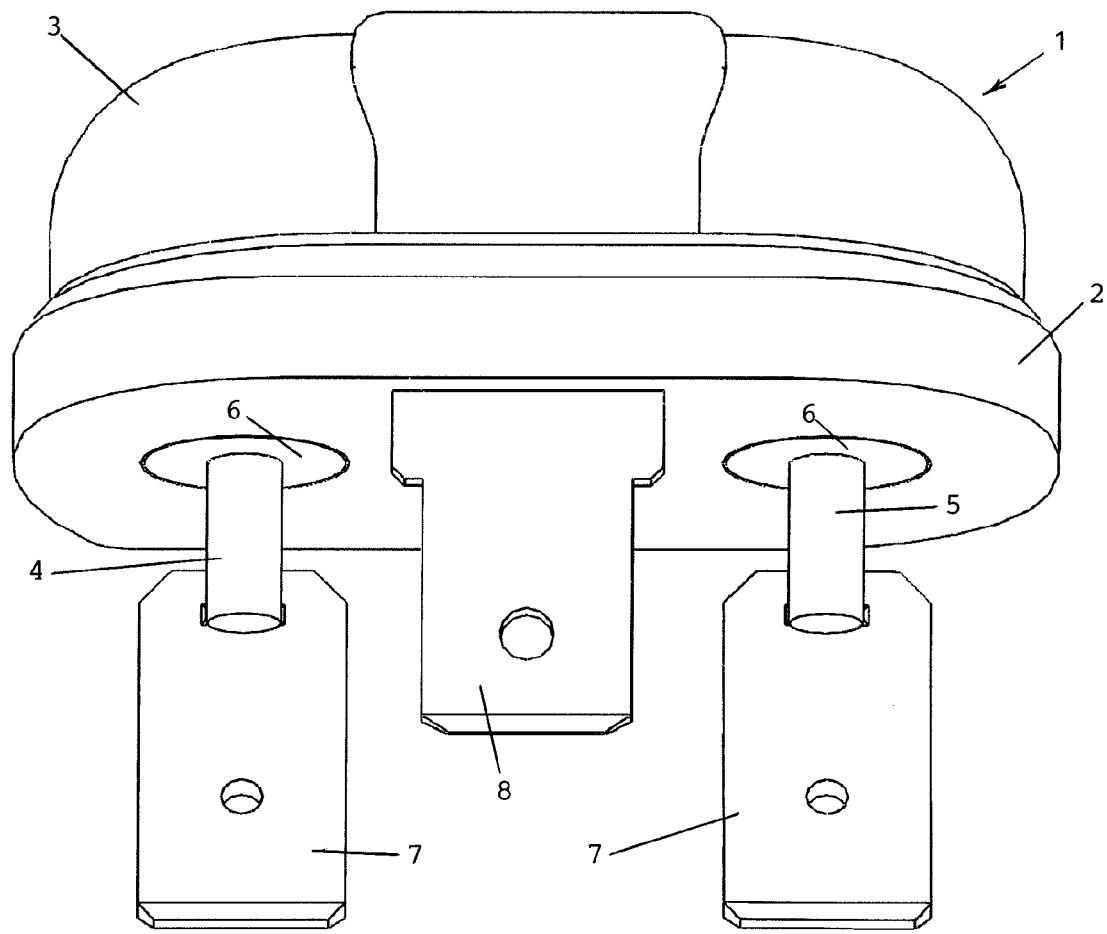
FIG. 1 is a perspective view of a three phase electric motor protector of the type with which the preferred embodiment is adapted for use.

The attachment system is particularly adapted for use with a motor protector of the type shown in FIG. 1. Motor protector 1 is a multiphase motor protector having a generally oval shaped base or header 2 with a cup shaped dome or housing member 3 attached to one face side of the header. Protector 1 has first and second terminal pins 4 and 5 respectively that extend from a location within the chamber formed by housing member 3 and header 4 to a point outside the chamber and are electrically isolated from the header by conventional glass eyelets 6 received in respective apertures in header 2. A terminal blade 7 is suitably attached to each pin, as by welding thereto and the pins are spaced a selected distance from the header to maintain suitable electrical isolation of the terminals from the header. A third terminal 8 also extends from header 2.

Figure 2:
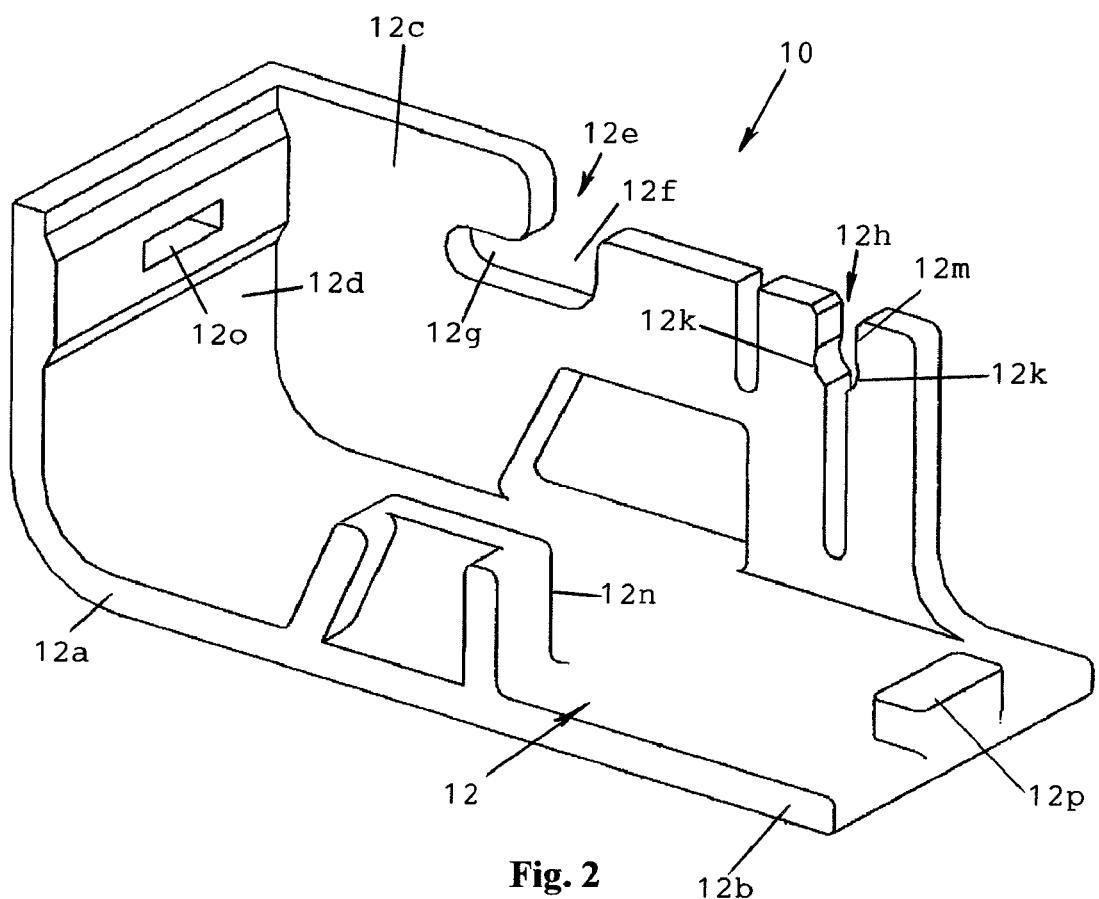
FIG. 2 is a perspective view of a bracket configured for securely mounting a motor protector of the type shown in FIG. 1 made in accordance with the preferred embodiment of the invention.

In accordance with the preferred embodiment of the invention, a bracket 10, as seen in FIG. 2, made of suitable moldable material, is configured to securely seat the motor protector of FIG. 1. The material, such as a glass filled resin PPS AX310MX04 (Toray, a trademark of Toray Industries, Inc, of Tokyo, Japan), is selected to provide a relatively rigid member that will allow permanent snap attachment of the motor protector. The bracket, made by injection molding, has a generally flat bottom wall 12 having a width between opposite side ends 12a, 12b and depth selected to accommodate motor protector 1. Back wall 12c extends upwardly from the bottom wall to a free distal end and is attached to a side wall 12d that extends upwardly from side 12a of bottom wall 12.

Back wall 12c is formed with a generally L-shaped first slot 12e having a first slot portion 12f substantially wider than the diameter of terminal pin 4 extending downwardly from the free distal end to the second slot portion 12g and in a direction generally normal to the bottom wall. Slot portion 12g has a width selected to closely accommodate pin 4 of motor protector 1 and with portion 12g in turn extending toward side wall 12d in a direction generally parallel to bottom wall 12.

A second slot 12h is formed in back wall 12c and extends from the free distal end of the wall in a direction generally normal to the bottom wall 12. The upper portion of slot 12h has a rounded or tapered entrance followed by a straight length portion 12m that leads to a cut-out pin seat portion 12k having opposed arc shaped pin receiving portions located essentially at the same distance from the bottom wall as second slot portion 12g, with slot 12h extending well beyond pin seat portion 12k to effectively form arm portions of the wall on either side of the slot. The size of the pin seat is chosen to closely accommodate pin 4 of the motor protector while the width of portion 12m is slightly less than the diameter of the arc shaped portions of the pin seat so that a force is required to be applied to a pin in order to slide a pin from the open end of the slot 12h into the pin seat 12k which then snaps into the pin seat portion 12k. Even though the glass filled resin is relatively rigid, terminal pin 4 can be forced through slot portion 12m with the arm portions biased apart sufficiently to allow passage of the pin to the pin seat. It should be noted that attempting to remove the pin from the pin seat will result in fracturing at least one of the arm portions. If it should be desirable to permit removal of the motor protector from the bracket the material of the bracket can be formulated to be more flexible.

A stop member 12n is formed projecting upwardly from bottom wall 12 spaced from back wall 12c and aligned laterally generally intermediate to slots 12f, 12h. The distance of stop member 12n from back wall 12c is selected to closely receive motor protector 1, that is, generally the distance from the top of the dome shaped housing 3 to the bottom surface of header 2 and serves to prevent movement of a motor protector away from back wall 12c once the protector is seated in the bracket.

A clip retaining slot 12o is formed in side wall 12d in the vicinity of the free end of the side wall and additional clip attachment features are formed on bottom wall 12 comprising a block shaped projection 12p formed at the center of bottom wall 12 at the edge of side end 12b as well as the remainder of the side end, as will be discussed below.

Figure 4:
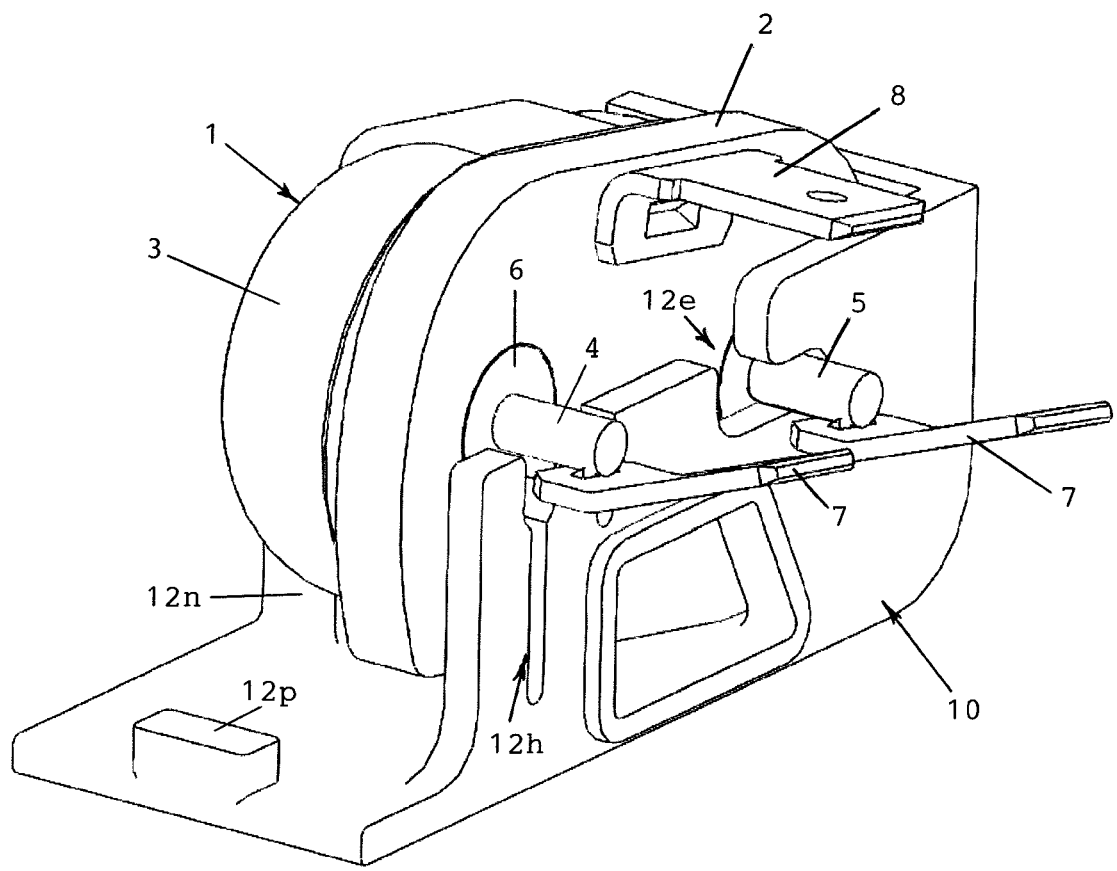
FIGS. 4 and 5 are rear perspective and rear elevation views of the FIG. 1 protector partially installed in the FIG. 2 bracket.
Figure 5:
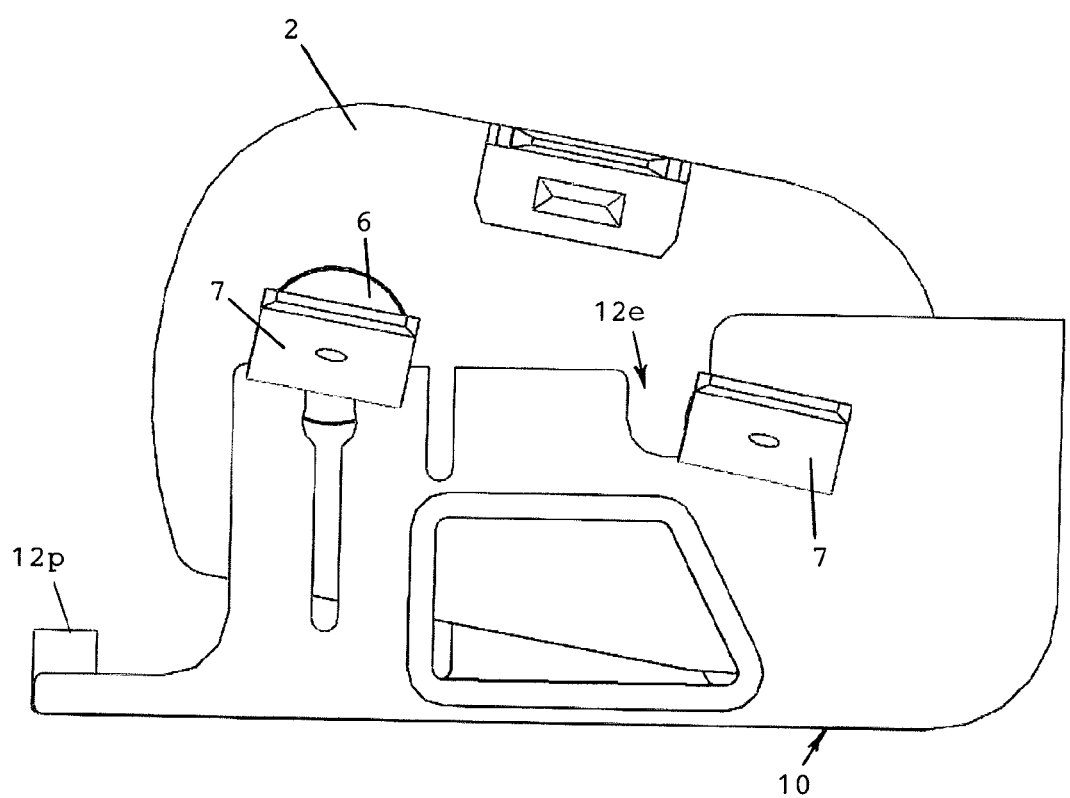
Figure 6:
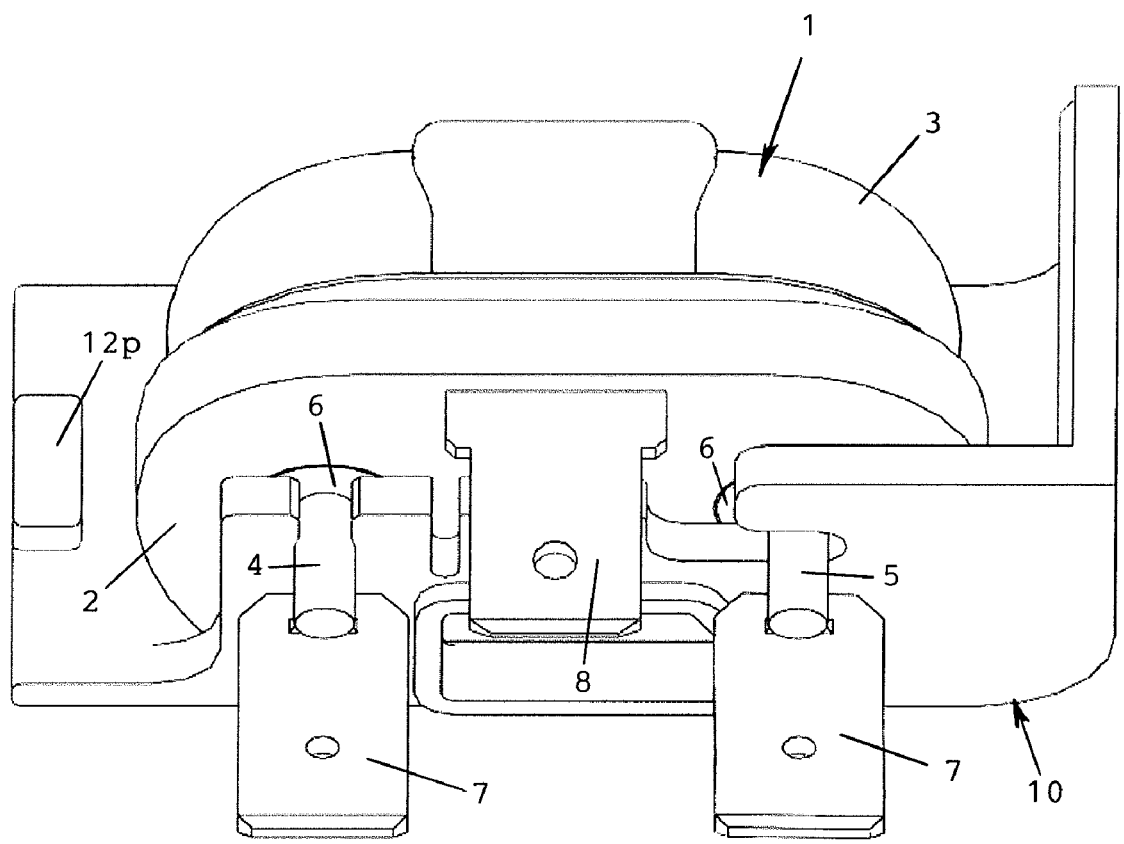
FIG. 6 is a perspective view of the completed assembly of the FIGS. 4 and 5 components.
Figure 7:
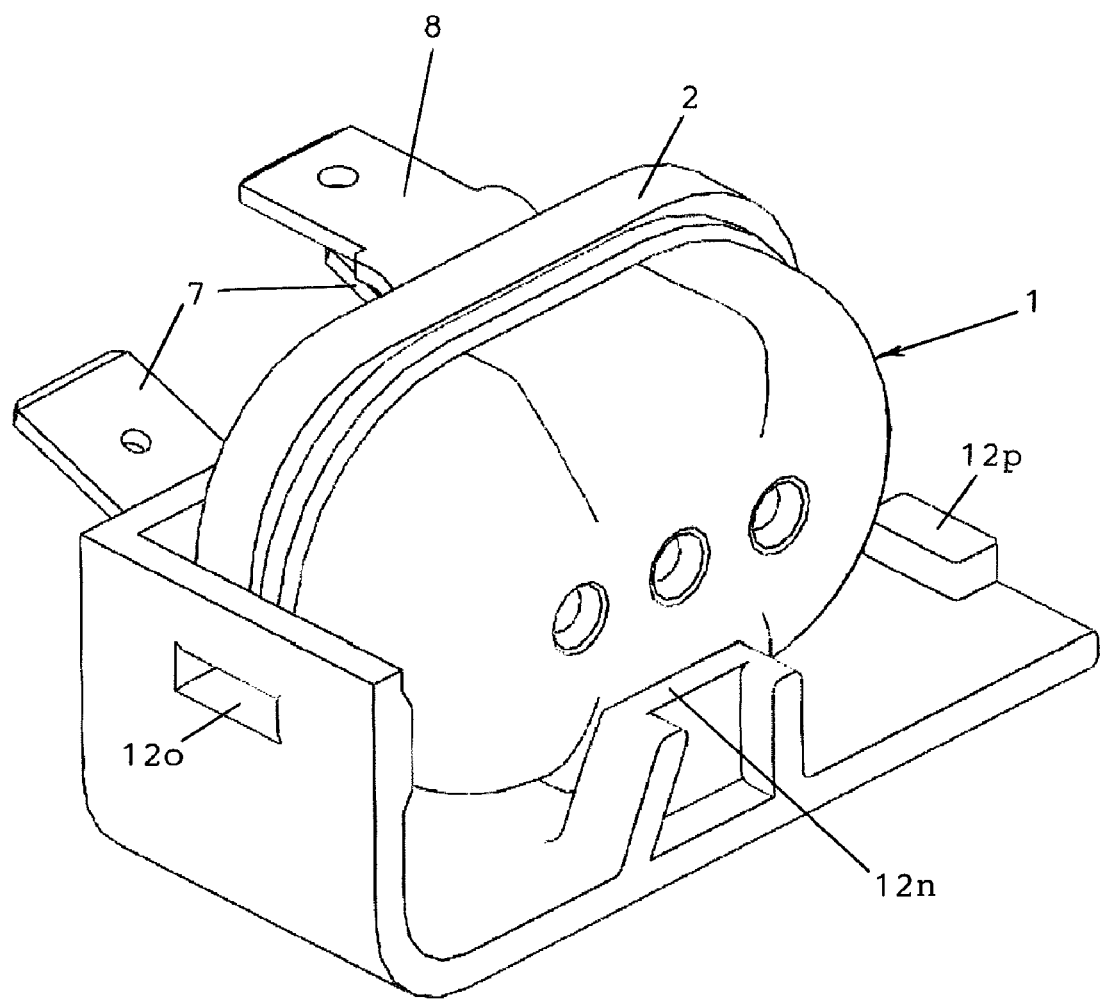
FIG. 7 is a perspective view of the FIG. 7 assembly taken from above and looking at the top of the dome shaped housing of the protector.
Figure 8:
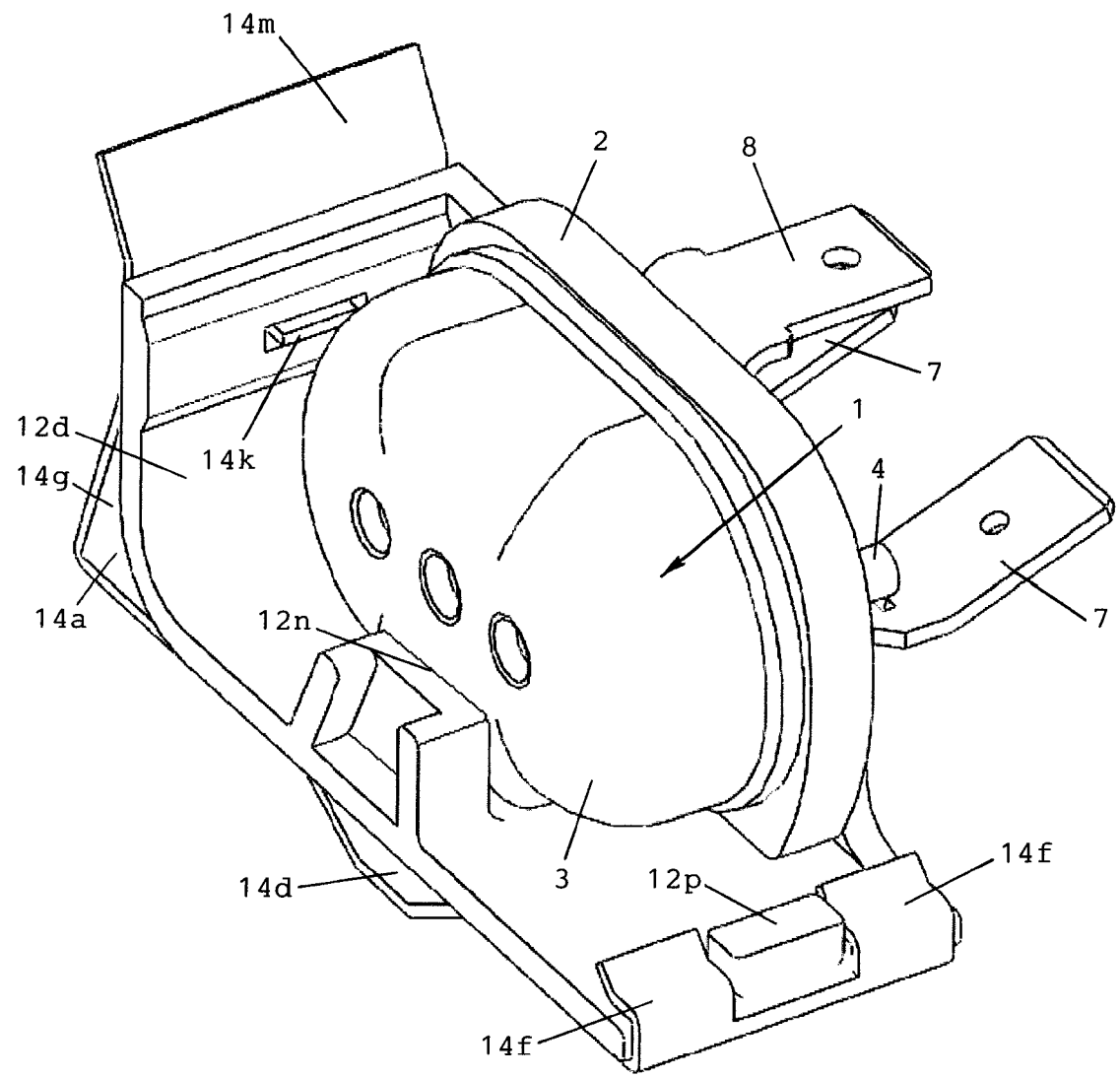
FIG. 8 is a perspective view of bracket and protector mounted as shown in FIG. 7 and shown with the bracket received in a clip shown without the motor.
Figure 9:
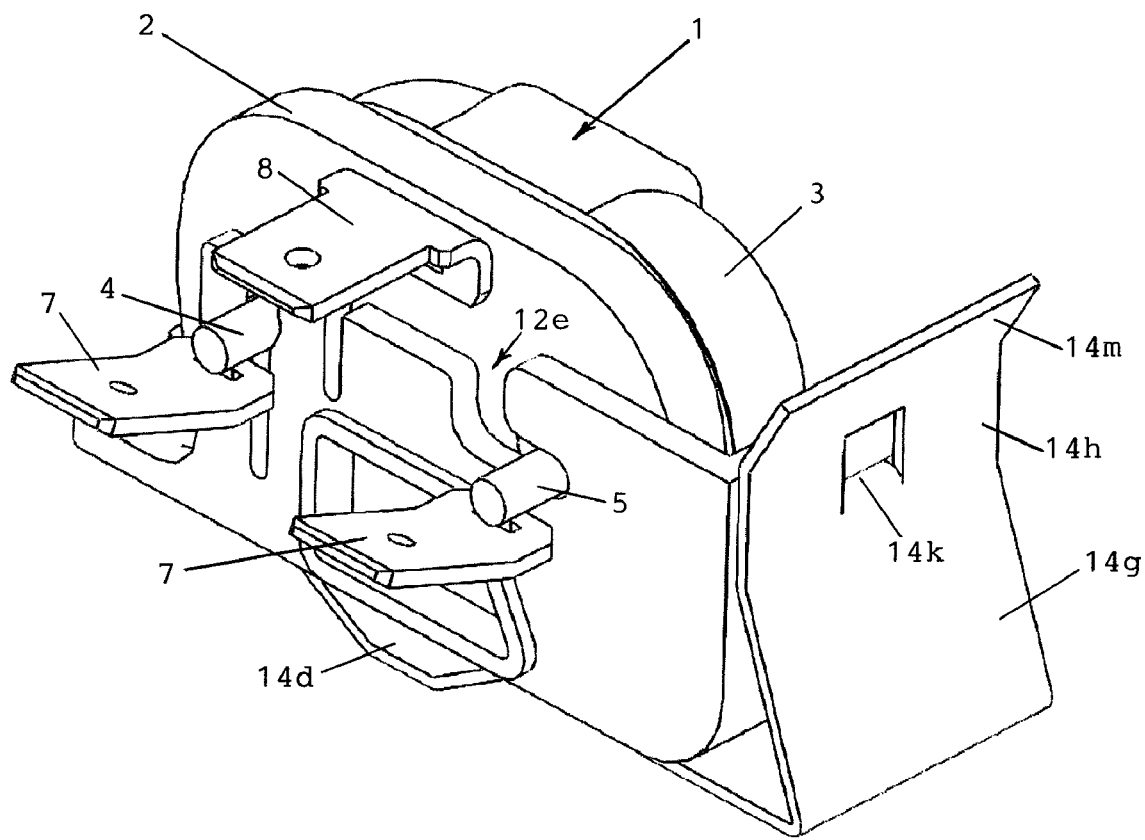
FIG. 9 is similar to FIG. 8 but shown from a different angle showing the bottom portion of the protector.

Motor protector 1 is mounted on bracket 10 by orienting the protector so that terminal pin 5 is lower than terminal pin 4 and inserting pin portion 5 between header 2 and blade 7 into slot 12e (FIGS. 4 and 5) and sliding the pin into the second slot portion 12g while rotating the protector so that terminal pin 4 is aligned with slot 12h and inserting pin 4 into slot 12h. A force is then applied to terminal pin 4 biasing the legs of back wall 12c apart slightly and snapping pin 4 into pin seat 12k (FIG. 6). The protector is then securely held in its seat with stop member 12n preventing movement of the pin along the longitudinal axes of the terminal pins. Thus motor protector 1 cannot be removed from bracket 10 regardless of shock and vibration. As mounted in the bracket, housing 3 of the motor protector is directly exposed to the ambient thereby providing suitable thermal coupling of the protector to the compressor.

Figure 3:
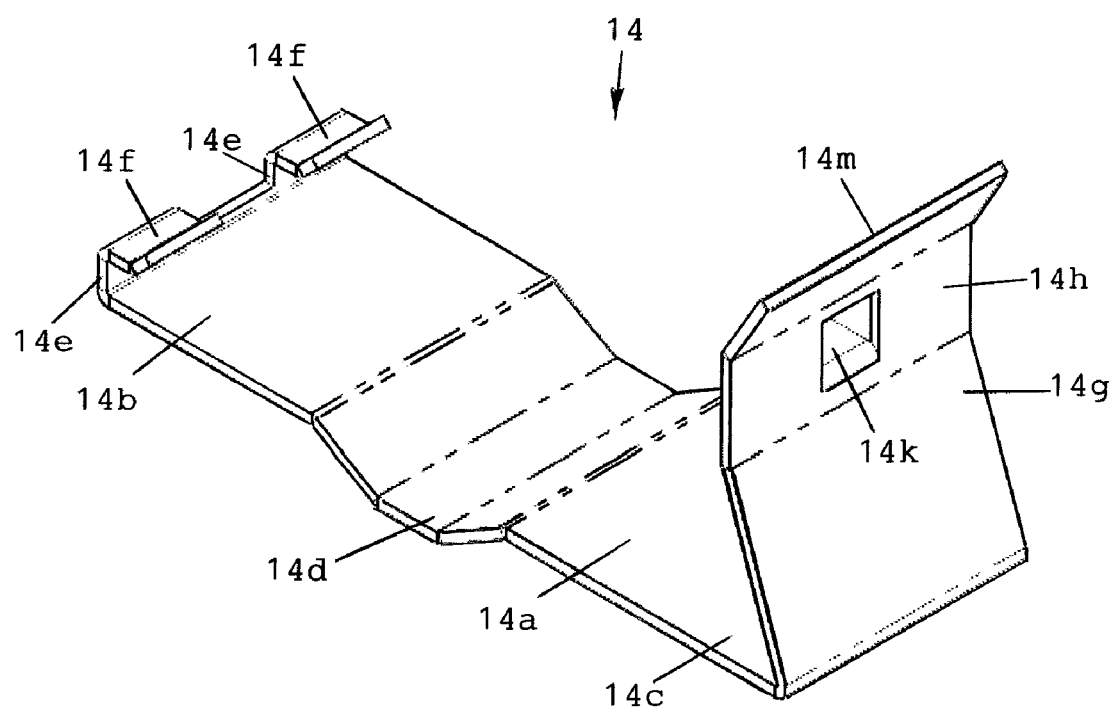
FIG. 3 is a perspective view of a spring clip which is adapted for securely mounting the FIG. 2 bracket and is adapted for permanent attachment to a motor casing.

With reference to FIG. 3, clip 14, composed of suitable metallic, preferably weldable material such as steel, has a thin bottom wall 14a that extends from side end 14b to opposite side end 14c. In order to facilitate welding the clip to a selected body, the bottom wall is formed with a concave shaped center portion 14d providing a convex portion when viewed from below bottom wall 14a. At side end 14b a pair of L-shaped attachment clasps 14e each having a tab portion 14f extending generally parallel to and spaced from wall 14a and toward the opposite side end 14c. Tab portions 14f are spaced from wall 14a a selected distance to accommodate bottom wall 12 bracket 10. Attachment clasps 14e are also spaced apart a distance selected to closely receive protrusion 12p therebetween.

An integrally formed side wall portion 14g extends upwardly from side end 14c and preferably forms an acute angle with bottom wall 14a. A second wall portion 14h is bent to extend from portion 14g at an angle generally normal to bottom wall 14a. A tab 14k is punched out of wall portion 14h and is formed to extend generally parallel to the bottom wall 14a and is positioned to be insertable in clip slot 12o of side wall 12d of bracket. Another wall 14m extends upwardly from wall portion 14h and is preferably angled back toward side end 14c and serves as a location for applying a force to bias the side wall in a direction away from the side end 14b.

In use, clip 14 is typically welded to the outer surface of a motor casing to be placed in a compressor housing. Motor protector 1 is mounted in bracket 10 as described above and then the side end 12b of bottom wall is inserted in clasps 14e with protrusion 12p therebetween and a force is applied to wall portion 14m, e.g., through the rounded side wall 12d of bracket 10, to move the side wall of the clip in a direction away from the attachment clasps allowing the bracket to be received on bottom wall 14a and tab 14k to be received in clip retaining slot 12o. The clip is designed so that it can withstand the force of insertion of quick connects during assembly without placing excessive force on the snap retention feature provided by tab 14k snapping into slot 12o.

It will be understood that the specification and preferred embodiment is intended to be illustrative and not limitative of the present invention and that other embodiments within the spirit and scope of the invention will suggest themselves to those skilled in the art.

What is claimed is:

1. Attachment apparatus for a motor protector comprising:
a motor protector bracket receiving clip for fixedly attaching to a motor casing, a motor protector receiving bracket removably attached on the clip, the bracket having first and second terminal pin receiving slots in a wall of the bracket, a terminal pin recessed seat formed in the second slot for snap reception of a terminal pin therein, the motor protector having at least two terminal pins projecting therefrom, each of the at least two terminal pins received in a respective slot, the first slot allowing one pin having a longitudinal axis to be inserted therein while the motor protector is rotated about the said longitudinal axis until the second pin is aligned with and received in the second slot and snapped into the recessed seat.

2. Attachment according to claim 1 in which the clip is composed of flexible metallic material.

3. Attachment apparatus according to claim 2 in which the clip has a bottom waif having top and bottom surfaces for receiving the motor protector on the top surface and a portion of the bottom wall of the clip is formed with a downwardly concave portion providing a convex portion when viewed from a position below the bottom surface for use in welding the clip to the motor protector.

4. Attachment apparatus for a motor protector according to claim 1 further in which the bracket has a bottom wall and further comprising a stop surface extending upwardly from the bottom wall spaced from the said a wall a distance selected to engage the motor protector when received in the bracket so that the motor protector is secured by the interaction of the said pin receiving slots in a wall and the stop surface against termination insertion forces, shock and vibration.

5. Attachment apparatus for mounting a motor protector in a housing for electrical connection with an electric motor disposed within the housing, the motor protector having a generally oval shape in plan view with a cup shaped housing received on a generally flat header, the motor protector having three terminals, at least two of the terminals being pins projecting from within the motor protector housing through the header and being spaced from one another by a distance d comprising:

a bracket having a flat bottom wall formed with an upstanding back wall and at least one side wall connected to the back wall, the back wall having a distal free end, a generally L-shaped slot having first and second slot portions extending from the distal free end of the back wall, the first slot portion extending toward the bottom wall to the second slot portion that in turn extends toward the said one side wall, to an end, a second slot extending from the distal free end of the back wall toward the bottom wall, the second slot being cut away to form a pin receiving seat at a location spaced from the bottom wall the same distance that the second slot portion of the first slot is spaced from the bottom wall, the pin seat being spaced from the said end of the first slot at least a distance d, a stop surface extending upwardly from the bottom wall and being spaced from the back wall a distance selected to engage the motor protector when received in the bracket, a clip retaining slot formed in the side wall and clip retaining features formed on the bottom wall, and a metallic spring clip having a bottom wall and a side wall, the clip formed with a selected width between first and second side ends to accommodate the bottom wall of the said bracket, the side wall of the clip disposed at one side end formed with a tab adapted for receipt in the clip receiving slot of the bracket, the second side end of the clip formed with attachment features engageable with the clip retaining features on the bottom wall of the bracket, the side wall being capable of being biased to allow the bracket to be attached to the clip, the clip adapted to be fixedly mounted to the casing of a motor.

6. Attachment apparatus according to claim 5 in which the bottom wall of the clip is formed with a concave shaped portion for welding attachment to the casing of a motor.

7. Attachment apparatus according to claim 5 in which the side wall of the bracket forms a curved profile with the bottom wall of the bracket to facilitate mounting of the bracket to the clip.

8. Attachment apparatus for mounting a motor protector in a housing for electrical connection with an electric motor enclosed within the housing, the motor protector having a generally cup shaped housing received on a generally flat header, the motor protector having three terminals, at least two of the terminals being pins projecting from within the motor protector housing through the header and being spaced from one another:

a bracket having a flat bottom wall formed with an upstanding back wall and at least one side wall connected to the back wall, the back wall having a distal free end, a generally L-shaped slot having first and second slot portions extending from the distal free end of the back wall, the first slot portion extending toward the bottom wall to the second slot portion that in turn extends toward the said one side wall to an end, a second slot extending from the distal free end of the back wall toward the bottom wall, the second slot being cut away to form a pin receiving seat at a location spaced from the bottom wall the same distance that the second slot portion of the first slot is spaced from the bottom wall, and a stop surface extending upwardly from the bottom wall and being spaced from the back wall a distance selected to engage the motor protector when received in the bracket so that the motor protector housing is directly exposed to the ambient to provide suitable thermal coupling to the ambient within the housing.

* * * * *